United States Patent
Nagasawa

(10) Patent No.: US 10,933,812 B1
(45) Date of Patent: Mar. 2, 2021

(54) OUTSIDE-VEHICLE ENVIRONMENT MONITORING APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/907,436

(22) Filed: Jun. 22, 2020

(30) Foreign Application Priority Data

Sep. 18, 2019 (JP) .............................. JP2019-169883

(51) Int. Cl.
- *B60R 1/06* (2006.01)
- *B60R 1/12* (2006.01)
- *H04N 5/247* (2006.01)
- *H04N 7/18* (2006.01)

(52) U.S. Cl.
CPC ............... *B60R 1/12* (2013.01); *H04N 5/247* (2013.01); *H04N 7/181* (2013.01); *B60R 2001/1253* (2013.01); *B60R 2300/105* (2013.01); *B60R 2300/20* (2013.01)

(58) Field of Classification Search
CPC ............. B60R 1/12; B60R 2001/1253; B60R 2300/105; B60R 2300/20; H04N 7/181; H04N 5/247
See application file for complete search history.

(56) References Cited

U.S. PATENT DOCUMENTS

| | | | |
|---|---|---|---|
| 9,096,175 B1* | 8/2015 | Harris | H04N 7/181 |
| 2004/0085447 A1* | 5/2004 | Katta | H04N 7/181 |
| | | | 348/143 |
| 2013/0044218 A1* | 2/2013 | Matsuda | G06T 3/00 |
| | | | 348/148 |
| 2013/0265431 A1* | 10/2013 | Hattori | B60R 1/00 |
| | | | 348/148 |
| 2017/0237882 A1* | 8/2017 | Shiohara | H04N 5/04 |
| | | | 348/148 |
| 2017/0249923 A1* | 8/2017 | Segawa | G02B 27/01 |

FOREIGN PATENT DOCUMENTS

JP          10-257482 A        9/1998

* cited by examiner

*Primary Examiner* — Sath V Perungavoor
*Assistant Examiner* — Tyler B Edwards
(74) *Attorney, Agent, or Firm* — McDermott Will & Emery LLP

(57) ABSTRACT

An outside-vehicle environment monitoring apparatus includes: imaging devices including center, right, and left imaging devices; a controller; and display devices including center, right, and left display devices. The imaging devices respectively capture images of environments present in a center rear direction, a right rear direction, and a left rear direction from the vehicle. The controller acquires captured images and output display images based on the captured images. The display devices are arranged side by side within a visual range of an occupant. The center display device is disposed between the right and left display devices at a visible distance from the occupant different from the visible distance to the right display device and the visible distance to the left display device. The center display image displayed between the right and left display devices is visually perceived as having a depth relative to the right and left display devices.

15 Claims, 5 Drawing Sheets

OUTSIDE-VEHICLE ENVIRONMENT MONITORING APPARATUS

CROSS-REFERENCE TO RELATED APPLICATIONS

The present application claims priority from Japanese Patent Application No. 2019-169883 filed on Sep. 18, 2019, the entire contents of which are hereby incorporated by reference.

BACKGROUND

The technology relates to an outside-vehicle environment monitoring apparatus. Vehicles, such as automobiles, are provided with an inside rear view mirror in the vehicle compartment and door mirrors on the sides of the vehicle body, for example. An occupant visually identifies an environment behind the vehicle with these mirrors. Recent vehicles are increasingly provided with cameras instead of a rear mirror, such as an inside rear view mirror, and door mirrors. Images of the environment behind the vehicle are generated by these cameras and displayed on a display device provided in the vehicle compartment. Such automated monitoring of the outside-vehicle environment using cameras rather than mirrors is expected to help the occupant to identify a moving object with higher visibility with being less affected by the environment outside the vehicle. For example, the captured images can be adjusted in brightness, or subjected to anti-glare processing to attenuate the light from the headlight of a following vehicle. Another conceivable technique, disclosed in Japanese Unexamined Patent Application Publication (JP-A) No. H10-257482, for example, can combine the images of the environment behind the vehicle into a single display picture representing an overall view behind the vehicle.

SUMMARY

An aspect of the technology provides an outside-vehicle environment monitoring apparatus including a plurality of imaging devices, a controller, and a plurality of display devices.

The plurality of imaging devices includes: a center imaging device configured to capture an image of an environment present in a center rear direction from a vehicle and generate a center captured image; a right imaging device configured to capture an image of an environment present in a right rear direction from the vehicle and generate a right captured image; and a left imaging device configured to capture an image of an environment present in a left rear direction from the vehicle and generate a left captured image.

The controller is configured to acquire captured images from the plurality of imaging devices and output display images based on the respective captured images. The plurality of display devices are arranged side by side in a vehicle compartment of the vehicle within a visual range of an occupant.

The plurality of display devices are configured to display the respective display images outputted from the controller. The display devices include: a center display device configured to display a center display image based on the center captured image generated by the center imaging device; a right display device disposed on a right side of the center display device as viewed from the occupant and configured to display a right display image based on the right captured image generated by the right imaging device; and a left display device disposed on a left side of the center display device as viewed from the occupant and configured to display a left display image based on the left captured image generated by the left imaging device.

The center display device is disposed between the right display device and the left display device at a visible distance from the occupant. The visible distance is different from a visible distance from the occupant to the right display device and a visible distance from the occupant to the left display device. The display devices are configured to allow the center display image displayed between the right display image and the left display image in the visual range to be visually perceived as having a depth relative to the right display image and the left display image.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

JP-A No. H10-257482 discloses a technique to combine a plurality of images of an environment behind a vehicle into a single composite display picture. The composite display picture, however, can be perceived as a planar or two-dimensional picture by an occupant of the vehicle, which hinders the occupant from estimating a distance from the occupant's vehicle (hereinafter also referred to as an own vehicle) to a moving object appearing in the image of the environment behind the vehicle. Additionally, in the use of the single composite display picture representing an overall view behind the vehicle, the occupant can find it difficult, just by visually observing the display picture, to determine whether the moving object is present at a position behind the center rear portion of the own vehicle or at a position shifted rightward or leftward from the center rear position of the own vehicle. Still additionally, the image processing that combines a plurality of images generated by imaging devices installed at different positions apart from each other (e.g., positions corresponding to the positions of the door mirrors and the inside rear view mirror of the vehicle) into a display picture of a single point-of-view involves changing the shapes or sizes of the captured images and combining the processed images through positional alignment. Such image processing can be complicated, reducing the performance of real-time image displaying immediately after the image capturing. The display picture produced through such complicated shaping and combining processes is likely to represent the outline of a moving object with lower resolution and at lower brightness.

It is desirable to provide an improved outside-vehicle environment monitoring apparatus.

Some example embodiments of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale.

First Example Embodiment

Figure 1:
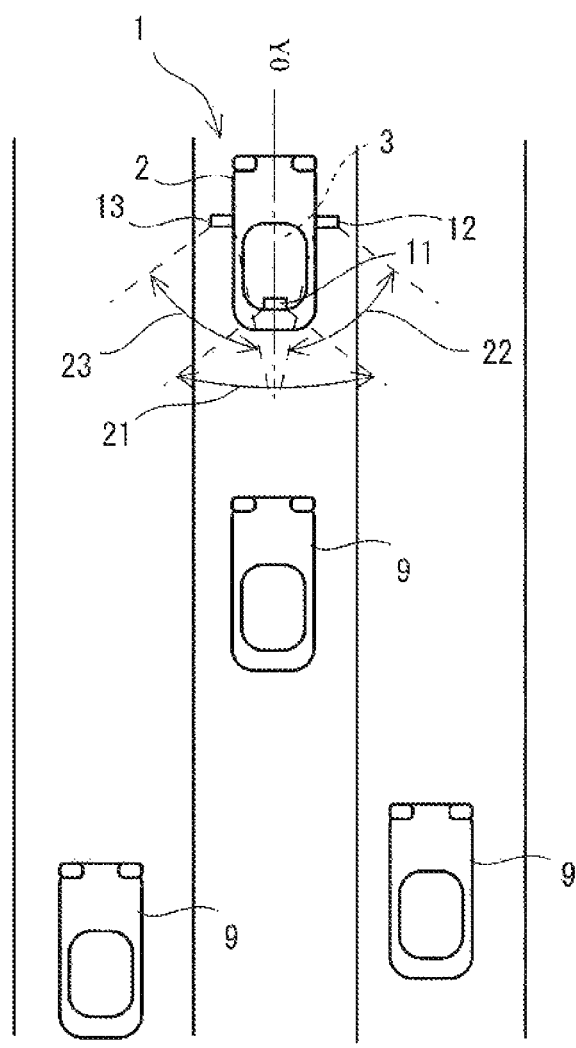
FIG. 1 is a diagram illustrating an exemplary traveling situation of an automatic vehicle provided with an outside-vehicle environment monitoring apparatus according to one example embodiment of the technology.

FIG. 1 is a diagram illustrating an exemplary traveling situation of an automatic vehicle 1 provided with an outside-vehicle environment monitoring apparatus 10 according to an example embodiment of the technology. FIG. 1 illustrates the automatic vehicle 1 traveling on the middle lane of a three-lane straight road. FIG. 1 also illustrates other automatic vehicles 9 traveling behind the automatic vehicle 1 on the middle lane on which the automatic vehicle 1 is traveling, the right lane, and the left lane. The automatic vehicle 1 illustrated in FIG. 1 may have a vehicle body 2. The vehicle body 2 may be provided with a vehicle compartment 3, at the middle thereof, to accommodate a driver or occupant.

Figure 2:
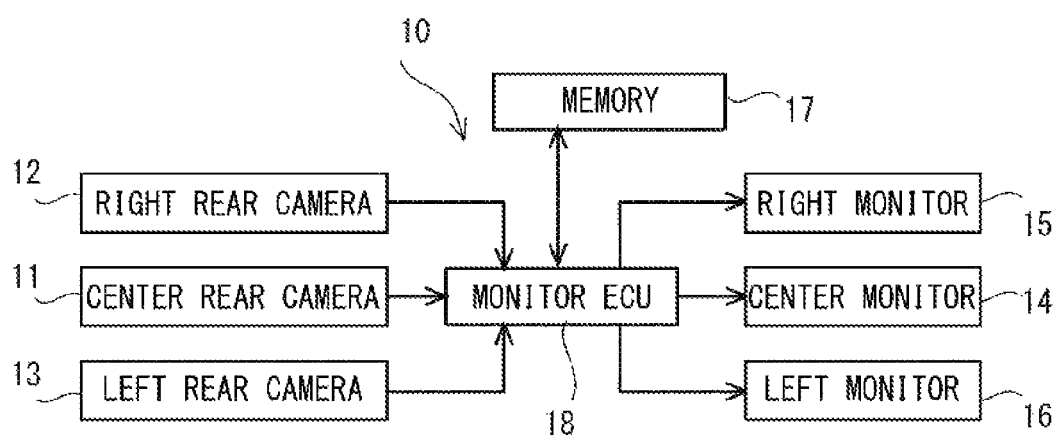
FIG. 2 is a block diagram illustrating an exemplary configuration of the outside-vehicle environment monitoring apparatus to be applied to the automatic vehicle illustrated in FIG. 1.

FIG. 2 is a block diagram illustrating an exemplary configuration of the outside-vehicle environment monitoring apparatus 10 to be applied to the automatic vehicle 1 illustrated in FIG. 1. The outside-vehicle environment monitoring apparatus 10 illustrated in FIG. 2 includes a center rear camera 11, a right rear camera 12, a left rear camera 13, a center monitor 14, a right monitor 15, a left monitor 16, and a monitor ECU 18. The outside-vehicle environment monitoring apparatus 10 may also include a memory 17. The center rear camera 11, the right rear camera 12, the left rear camera 13, the center monitor 14, the right monitor 15, the left monitor 16, and the memory 17 may be coupled to the monitor ECU 18. One or more of the right rear camera 12, the left rear camera 13, the center rear camera 11, the center monitor 14, the right monitor 15, and the left monitor 16 may be coupled to the monitor ECU 18 via an in-vehicle network of the automatic vehicle 1.

The right rear camera 12 captures an image of the environment present in the right rear direction from the automatic vehicle 1. In one embodiment, the right rear camera 12 may serve as a "right imaging device". The left rear camera 13 captures an image of the environment present in the left rear direction from the automatic vehicle 1. In one embodiment, the left rear camera 13 may serve as a "left imaging device". The center rear camera 11 captures an image of the environment present in the center rear direction from the automatic vehicle 1. In one embodiment, the center rear camera 11 may serve as a "center imaging device". As illustrated in FIG. 1, for example, the right rear camera 12 may be installed on the right side face of the vehicle body 2 of the automatic vehicle 1 at an installation position of a right door mirror on the assumption that the right door mirror is provided on the automatic vehicle 1, and the left rear camera 13 may be installed on the left side face of the vehicle body 2 of the automatic vehicle 1 at an installation position of a left door mirror on the assumption that the left door mirror is provided on the automatic vehicle 1. The right rear camera 12 may be directed to a diagonally right rear direction relative to the automatic vehicle 1, and the left rear camera 13 may be directed to a diagonally left rear direction relative to the automatic vehicle 1. Thus, the right rear camera 12 may capture an image of the environment within a range defined between a line extending along the right side face of the vehicle body 2 in the rear direction and a line extending in a substantially right lateral direction from the right side of the vehicle body 2, and generate a right captured image. The left rear camera 13 may capture an image of the environment within a range defined between a line extending along the left side face of the vehicle body 2 in the rear direction and a line extending in a substantially left lateral direction from the left side of the vehicle body 2, and generate a left captured image. The center rear camera 11 may be installed at a center position of the rear portion of the vehicle compartment 3, as illustrated in FIG. 1, for example. For instance, the center rear camera 11 may be disposed below the roof of the vehicle body 2. The center rear camera 11 may be directed to a direction straight behind the vehicle body 2. Thus, the center rear camera 11 may capture an image of the environment within a range defined between a diagonally right rear direction and a diagonally left rear direction, centering around the direction straight behind the vehicle body 2, and generate a center captured image. The imaging range of the center rear camera 11 may overlap the imaging range of the right rear camera 12 and the imaging range of the left rear camera 13.

The memory 17 may store programs to be used for the control executed by the monitor ECU 18.

The monitor ECU 18 may read a program from the memory 17 and execute the program. The monitor ECU 18 may thus serve as a controller of the outside-vehicle environment monitoring apparatus 10. In one embodiment, the monitor ECU 18 may serve as a "controller". The monitor ECU 18 acquires the right captured image from the right rear camera 12, the left captured image from the left rear camera 13, and the center captured image from the center rear camera 11. The monitor ECU 18 creates a center display image, a right display image, and a left display image from the captured images. For example, the monitor ECU 18 may create each display image by cutting a predetermined portion of the corresponding captured image. The monitor ECU 18 respectively outputs the created center display image, the created right display image, and the created left display image to the center monitor 14, the right monitor 15, and the left monitor 16. After acquiring the captured images from the imaging devices, the monitor ECU 18 may basically output the display images based on the captured images without change.

The center monitor 14 displays the center display image based on the center captured image generated by the center rear camera 11. In one embodiment, the center monitor 14 may serve as a "center display device". The right monitor 15 displays the right display image based on the right captured image generated by the right rear camera 12. In one embodiment, the right monitor 15 may serve as a "right display device". The left monitor 16 displays the left display image based on the left captured image generated by the left rear camera 13. In one embodiment, the left monitor 16 may serve as a "left display device".

Figure 3:
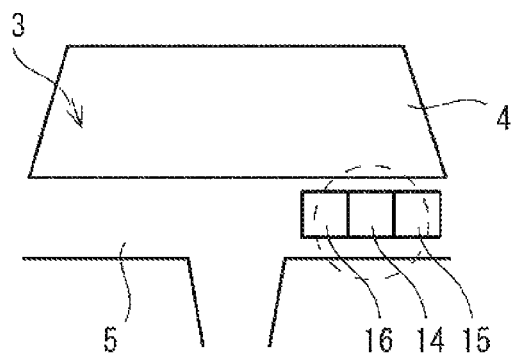
FIG. 3 is a diagram illustrating an exemplary layout of display devices illustrated in FIG. 2 in the vehicle compartment of the vehicle.

FIG. 3 illustrates an exemplary layout of the display devices of FIG. 2 in the vehicle compartment 3 of the automatic vehicle 1. In FIG. 3, a front interior portion of the vehicle compartment 3 is illustrated. In the front interior portion of the vehicle compartment 3, a dashboard 5 may be provided below a windshield 4. The center monitor 14, the right monitor 15, and the left monitor 16 may be embedded in the dashboard 5 in a fixed manner. For example, the center monitor 14, the right monitor 15, and the left monitor 16 may be liquid crystal panels each having a substantially quadrangular plate shape and a display screen on one side. The display screen may be a substantially quadrangular screen on which an image is displayed. The right monitor 15 and the left monitor 16 may be respectively disposed on the right and left sides of the center monitor 14. The overall layout of the center monitor 14, the right monitor 15, and the left monitor 16 in the dashboard 5 may be finely adjustable on the basis of the physical size of the occupant, for example. This allows the occupant to identify the environment behind the automatic vehicle 1 by visually observing the display images on the monitors arranged below the windshield 4 while identifying the environment in front of the automatic vehicle 1 through the windshield 4.

In the example embodiment in which the center, right, and left display images respectively based on the center, right, left captured images generated by the center rear camera 11, the right rear camera 12, and the left rear camera 13 are respectively displayed on the center monitor 14, the right monitor 15, and the left monitor 16 that are disposed in the vehicle compartment 3, the display images may be adjusted in brightness or subjected to anti-glare processing to attenuate the light from the headlight of a vehicle behind the automatic vehicle 1. This facilitates visual identification of a moving object in the display images. Such automated monitoring of the environment outside the automatic vehicle 1 facilitates visual identification of the environment behind the own vehicle, compared with the monitoring using a rear mirror, such as an inside rear view mirror, and door mirrors. Therefore, the automated monitoring is expected to facilitate identification of the environment behind the own vehicle with higher visibility with being less affected by the environment outside the own vehicle. However, the images of the environment behind the automatic vehicle 1 displayed on the monitors arranged side by side, for example, can be perceived by the occupant as a planar or two-dimensional picture. This can hinder the occupant from estimating a distance or direction from the own vehicle to a moving object present behind the own vehicle just by visually observing the images. In contrast, in the monitoring using an inside rear view mirror and door mirrors in which the occupant turns his/her eyes from one to another between the positions of these mirrors to confirm images on the mirrors, the occupant can easily estimate a direction from the own vehicle to a moving object present behind the own vehicle on the basis of the visual confirmation of the images on the mirrors. Therefore, a further improvement is needed for the outside-vehicle environment monitoring apparatus 10.

Figure 4:
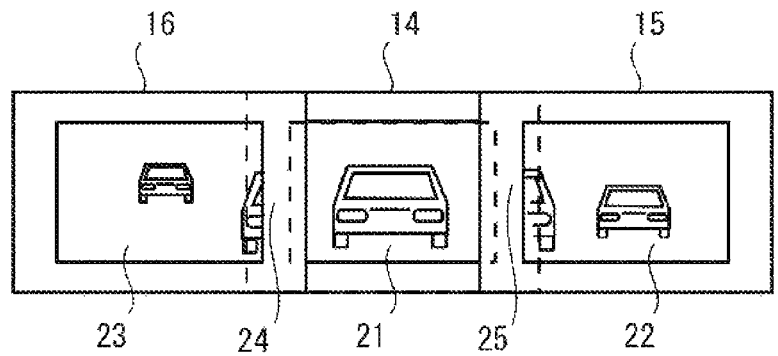
FIG. 4 is a diagram illustrating an exemplary arrangement of the display devices according to one example embodiment of the technology in which the display devices are disposed overlapping each other.
Figure 5:
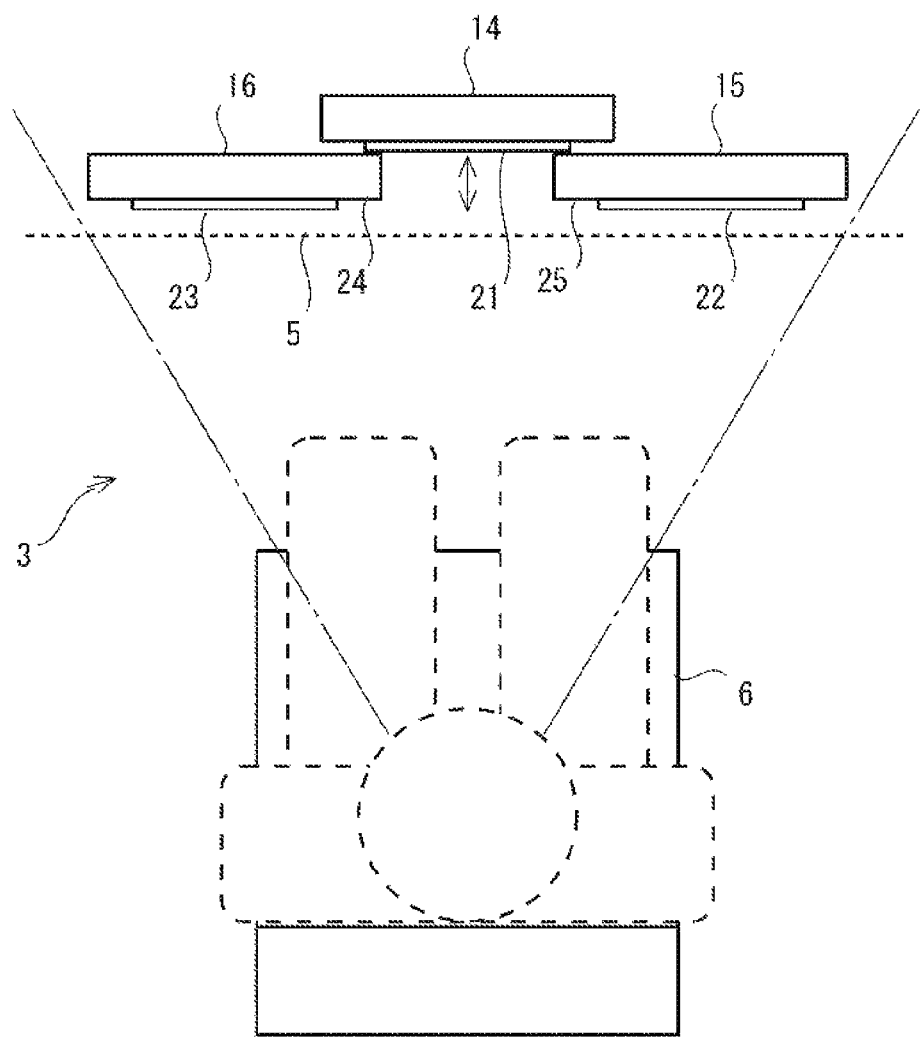
FIG. 5 is a diagram illustrating an exemplary longitudinal positional relation between the display devices illustrated in FIG. 4, and an exemplary state of the occupant visually observing the display devices.

FIG. 4 is a diagram illustrating an exemplary layout of the display devices according to a first example embodiment of the technology, as viewed from a seat 6 on which the occupant is seated. In FIG. 4, the center monitor 14, the right monitor 15, and the left monitor 16 are arranged overlapping each other in the exemplary layout. FIG. 5 illustrates an exemplary longitudinal positional relation between the display devices illustrated in FIG. 4, and an exemplary state of the occupant visually observing the display devices as viewed from an upper portion of the vehicle compartment 3 of the automatic vehicle 1. In FIG. 5, the occupant is seated on the seat 6 in the vehicle compartment 3 of the automatic vehicle 1.

As illustrated in FIG. 5, the center monitor 14, the right monitor 15, and the left monitor 16 may be embedded side by side in the dashboard 5 in front of the seat 6. All of the center monitor 14, the right monitor 15, and the left monitor 16 embedded side by side in the dashboard 5 are arranged within the front visual range of the occupant seated on the seat 6.

The right monitor 15 and the left monitor 16 may be arranged side by side along the lateral direction of the automatic vehicle 1 with a gap smaller than the width of the display screen 21 of the center monitor 14. The center monitor 14 is disposed at a position between the right monitor 15 and the left monitor 16 and more frontward than the positions of the right monitor 15 and the left monitor 16. The center monitor 14 is disposed at a position farther from the seat 6 than the right monitor 15 and the left monitor 16 are. The display screen 21 of the center monitor 14 is disposed at a position farther from the seat 6 in the vehicle compartment 3 of the automatic vehicle 1 than the display screen 22 of the right monitor 15 and the display screen 23 of the left monitor 16 are.

Thus, in the visual field of the occupant seated on the seat 6, the display screen 21 of the center monitor 14 is disposed between the display screen 22 of the right monitor 15 and the display screen 23 of the left monitor 16 at a visible distance from the occupant different from the visible distance from the occupant to the display screen 22 of the right monitor 15 and the visible distance from the occupant to the visible distance to the display screen 23 of the left monitor 16. Therefore, the center display image appearing on the center monitor 14 disposed between the right monitor 15 displaying the right display image and the left monitor 16 displaying the left display image is visually perceived as having a depth relative to the right display image and the left display image.

As illustrated in FIG. 4, the right monitor 15 may have a substantially quadrangular outer shape and a left end part 25 adjacent to the center monitor 14 having a substantially quadrangular outer shape. The left end part 25 may overlap a part of a right end part 24 of the substantially quadrangular display screen 21 of the center monitor 14. The left monitor 16 may have a substantially quadrangular outer shape and a right end part 24 adjacent to the center monitor 14 having a substantially quadrangular outer shape. The right end part 24 may overlap a part of a left end part 25 of the substantially quadrangular display screen 21 of the center monitor 14. Thus, the right and left end parts of the substantially quadrangular display screen 21 of the center monitor 14 may be made invisible by being respectively covered with the right monitor 15 and the left monitor 16, and the center part of the display screen 21 may be uncovered with the right monitor 15 and the left monitor 16.

In the example embodiments described above, the display devices that display the respective display images based on the respective captured images outputted from the controller are visually perceived as being arranged side by side by the occupant in the vehicle compartment 3 of the automatic vehicle 1. The display screen 21 of the center monitor 14 is disposed between the display screen 22 of the right monitor 15 and the display screen 23 of the left monitor 16 at a visible distance from the occupant different from the visible distance from the occupant to the display screen 22 of the right monitor 15 and the visible distance from the occupant to the display screen 23 of the left monitor 16. Such a way of displaying allows the center display image appearing between the right display image and the left display image to be visually perceived as having a visible distance different from those of the right and left display images, i.e., as having a depth relative to the right display image and the left display image. Unlike a single planar or two-dimensional picture produced by processing a plurality of images, for example, these separate images do not form a planar or two-dimensional picture. In other words, these separate images form a three-dimensional picture. In this way, the outside-vehicle environment monitoring apparatus 10 displays the right display image, the left display image, and the center display image as separate images at different visible distances from the occupant. This allows the occupant to visually perceive the display images as a picture having a depth. It is thus possible for the occupant to intuitively identify the visual directions of the respective images representing the environment behind the automatic vehicle 1 with a sense of perspective when observing the images arranged side by side.

After acquiring the captured images from the imaging devices, the controller may basically output the display images based on the captured images without change. The display images based on the images generated by the imaging devices are displayed on the respective display devices. This achieves high performance real-time displaying. Additionally, the moving object present behind the automatic vehicle 1 in the captured images may be represented substantially as is in the display images. The image of the moving object may be represented in the display images with substantially the same image quality as that at the time of capturing. This allows the occupant to easily identify the direction from the own vehicle to the moving object present behind the own vehicle on the basis of, for example, a difference between a display state where the same moving object is appearing on all of the display images and a display state where the moving object is appearing on either one of the display images. The display images arranged side by side provides the occupant with information equivalent to the information provided by using an inside rear view mirror and door mirrors in combination.

In the example embodiments described above, the right monitor 15 and the left monitor 16 may respectively overlap the right and left sides of the display screen 21 of the center monitor 14. The right and left end parts of the display screen 21 of the center monitor 14 may be made invisible by being respectively covered with the right monitor 15 and the left monitor 16, and the center part of the display screen 21 may be uncovered with the right monitor 15 and the left monitor 16. The center monitor 14 may thus have the quadrangular display screen 21 as an ordinary monitor does. This eliminates the need for shaping the center captured image to create the center display image at the monitor ECU 18 serving as the controller. [Second Example Embodiment]

The outside-vehicle environment monitoring apparatus 10 according to a second example embodiment of the technology will now be described. The following description is focused on a difference between the second example embodiment and the example embodiments described above. In the following description, elements having substantially the same configuration are denoted with the same numerals as those in the example embodiments described above to avoid any redundant description.

Figure 6:
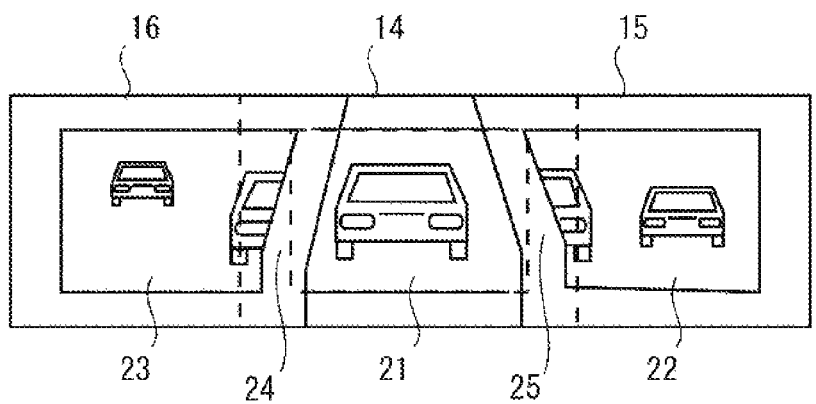
FIG. 6 is a diagram illustrating another exemplary arrangement of the display devices according to one example embodiment of the technology in which the display devices are disposed overlapping each other.

FIG. 6 is a diagram illustrating the display devices arranged overlapping each other according to the second example embodiment of the technology.

The left end part 25 of the right monitor 15 adjacent to the center monitor 14 may have a shape moderately curved such that an upper edge of the left end part 25 protrudes further leftward than a lower edge of the left end part 25. The left end part of the display screen 22 of the right monitor 15 may also have a shape moderately curved along the left end part 25 such that an upper edge of the left end part of the display screen 22 protrudes further leftward than a lower edge of the left end part of the display screen 22. In this case, the monitor ECU 18 may create the right display image by cutting the right captured image received from the right rear camera 12 into a shape conforming to the left end part 25, and output the created right display image to the right monitor 15. The right end part 24 of the left monitor 16 adjacent to the center monitor 14 may have a shape moderately curved such that an upper edge of the right end part 24 protrudes further rightward than a lower edge of the right end part 24. The right end part of the display screen 23 of the left monitor 16 may also have a shape moderately curved along the right end part 24 such that an upper edge of the right end part of the display screen 23 protrudes further rightward than a lower edge of the right end part of the display screen 23. In this case, the monitor ECU 18 may create the left display image by cutting the left captured image received from the left rear camera 13 into a shape conforming to the right end part 24, and output the created left display image to the left monitor 16.

Figure 7:
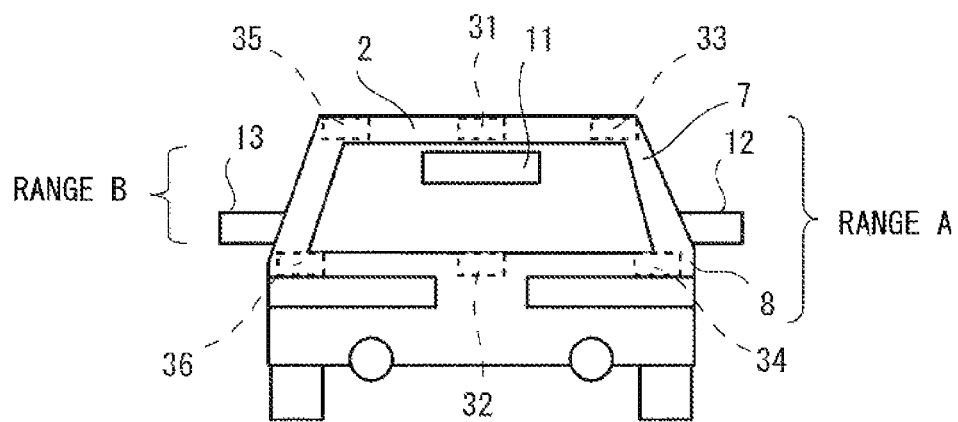
FIG. 7 is a rear view of the automatic vehicle illustrated in FIG. 1.

FIG. 7 is a rear view of the automatic vehicle 1 illustrated in FIG. 1. In a case where right and left door mirrors are respectively provided on the right and left sides of the automatic vehicle 1, the environment behind the automatic vehicle 1 may be visually observed using the door mirrors.

The vehicle body 2 of the automatic vehicle 1 illustrated in FIG. 7 may have a moderately curved right side face that slopes leftward at its upper portion and extends substantially vertically at its lower portion. The left end part 25 of the right monitor 15 illustrated in FIG. 6 may have an outer shape conforming to the contour shape of the right side face of the vehicle body 2 within a range A visible from an installation position of a right door mirror on the assumption that the right door mirror is provided on the automatic vehicle 1. The vehicle body 2 of the automatic vehicle 1 may have a moderately curved left side face that slopes rightward at its upper portion and extends substantially vertically at its lower portion. The right end part of the left monitor 16 illustrated in FIG. 6 may have an outer shape conforming to the contour shape of the left side face of the vehicle body 2 within a range B visible from an installation position of a left door mirror on the assumption that the left door mirror is provided on the automatic vehicle 1.

In this way, the boundary between the center display image and the right display image may have an outer shape conforming to the right side face of the rear portion of the vehicle body 2 visually identifiable from, for example, an installation position of a right door mirror on the assumption that the right door mirror is provided on the automatic vehicle 1, and the boundary between the center display image and the left display image may have an outer shape conforming to the left side face of the rear portion of the vehicle body 2 visually identifiable from, for example, an installation position of a left door mirror on the assumption that the left door mirror is provided on the automatic vehicle 1. The center monitor 14 may display the center display image of the environment present in the center rear direction from the automatic vehicle 1 at a position between: the right monitor 15 having the outer shape conforming to the contour shape of the right side face of the vehicle body 2; and the left monitor 16 having the outer shape conforming to the contour shape of the left side face of the vehicle body 2, and more frontward than the positions of the right monitor 15 and the left monitor 16. The center display image displayed on the display screen 21 of the center monitor 14 may thus be visually perceived within a frame defined by: the outer shape of the right monitor 15 having the shape conforming to the contour shape of the right side face of the vehicle body 2 of the automatic vehicle; and the outer shape of the left monitor 16 having the shape conforming to the contour shape of the left side face of the vehicle body 2 of the automatic vehicle 1. The left monitor 16 may display the left display image of the environment present in the left rear direction from the automatic vehicle 1, in a region leftward from the portion having the outer shape conforming to the left side face of the vehicle body 2. The left display image may be displayed on the display screen 23 of the left monitor 16, the display screen 23 having the outer shape conforming to the contour shape of the left side face of the vehicle body 2 of the automatic vehicle 1. The right monitor 15 may display the right display image of the environment present in the right rear direction from the automatic vehicle 1, in a region rightward from the portion having the outer shape conforming to the right side face of the vehicle body 2. The right display image may be displayed on the display screen 22 of the right monitor 15, the display screen 22 having a shape conforming to the contour shape face of the right side face of the vehicle body 2 of the automatic vehicle 1.

In the second example embodiment described above, the end of the right monitor 15 adjacent to the center monitor 14 may have the outer shape conforming to the contour shape of the right side face of the vehicle body 2 of the automatic vehicle 1 visually identifiable from an installation position of a right door mirror on the assumption that the right door mirror is provided on the automatic vehicle 1, and the end of the left monitor 16 adjacent to the center monitor 14 may have the outer shape conforming to the contour shape of the left side face of the vehicle body 2 of the automatic vehicle 1 visually identifiable from an installation position of a left door mirror on the assumption that the left door mirror is provided on the automatic vehicle 1. The center monitor 14 may display the center display image of the environment present in the center rear direction from the automatic vehicle 1, at the position between the outer shapes of the right monitor 15 and the left monitor 16 and more frontward than the positions of the right monitor 15 and the left monitor 16. The right monitor 15 may display the right display image of the environment present in the right rear direction from the automatic vehicle 1, in the region rightward from its end having the outer shape conforming to the right side face of the vehicle body 2. The left monitor 16 may display the left display image of the environment present in the left rear direction from the automatic vehicle 1, in the region leftward from its end having the outer shape conforming to the left side face of the vehicle body 2. The right display image and the left display image may be disposed at a longitudinal distance from the center display image.

In the second example embodiment, the left end of the display screen 22 of the right monitor 15 adjacent to the center monitor 14 may have the shape conforming to the contour shape of the right side face of the vehicle body 2 visually identifiable from an installation position of a right door mirror on the assumption that the right door mirror is provided on the automatic vehicle 1. Additionally, the right end of the display screen 23 of the left monitor 16 adjacent to the center monitor 14 may have the shape conforming to the contour shape of the left side face of the vehicle body 2 visually identifiable from an installation position of a left door mirror on the assumption that the left door mirror is provided on the automatic vehicle 1. The right monitor 15 and the left monitor 16 respectively provided on the right and left sides of the center monitor 14 may thus be closer to the center monitor 14. As a result, the width of the right end part 24 provided between the display screen 23 of the left monitor 16 and the display screen 21 of the center monitor 14 and having the outer shape conforming to the contour shape of the left side face of the vehicle body 2 of the automatic vehicle 1 may be reduced, and the width of the left end part 25 provided between the display screen 22 of the right monitor 15 and the display screen 21 of the center monitor 14 and having the outer shape conforming to the contour shape of the right side face of the vehicle body 2 of the automatic vehicle 1 may be reduced. Since the portions between the display images are reduced in width, the display images on the center monitor 14, the right monitor 15, and the left monitor 16 are well integrated into a single picture representing the overall view behind the automatic vehicle 1. The well-integrated picture is unlikely to make the occupant of the automatic vehicle 1 feel the separation of the right and left display images from the center display image.

Figure 8:
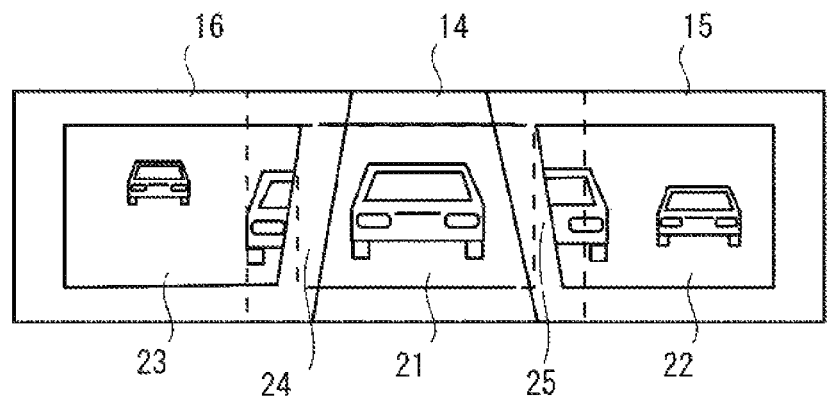
FIG. 8 is a diagram illustrating still another exemplary arrangement of the display devices according to a modification example of one example embodiment of the technology in which the display devices are disposed overlapping each other.

FIG. 8 illustrates another exemplary arrangement of the display devices overlapping each other according to a modification example of the second example embodiment of the technology.

In FIG. 8, the right end part 24 of the left monitor 16 may have an outer shape conforming to the contour shape of the left side face of the vehicle body 2 of the automatic vehicle 1 illustrated in FIG. 7 within the range B visible from the seat 6 in the vehicle compartment 3 in the rear direction. The left end part 25 of the right monitor 15 may have an outer shape conforming to the contour shape of the right side face of the vehicle body 2 of the automatic vehicle 1 illustrated in FIG. 7 within the range A visible from the seat 6 in the vehicle compartment 3 in the rear direction. The center monitor 14 may display the center display image of the environment present in the center rear direction from the automatic vehicle 1, at a position between the outer shapes of the right monitor 15 and the left monitor 16 and more frontward than the positions of the right monitor 15 and the left monitor 16. The right monitor 15 may display the right display image of the environment present in the right rear direction from the automatic vehicle 1, in a region rightward from its end part having the outer shape conforming to the right side face of vehicle body 2. The left monitor 16 may display the left display image of the environment present in the left rear direction from the automatic vehicle 1, in a region leftward from its end part having the outer shape conforming to the left side face of the vehicle body 2. The right display image and the left display image may be displayed at a longitudinal distance from the center display image. Accordingly, the center display image and the right and left display images respectively displayed on the right and left of the center display image may be arranged in the same layout as the actual environment visible from the seat 6 in the vehicle compartment 3 in the automatic vehicle 1 in the rear direction.

Third Example Embodiment

The outside-vehicle environment monitoring apparatus 10 according to a third example embodiment of the technology will now be described. The following description is focused on a difference between the third example embodiment and the example embodiments described above. In the following description, elements having substantially the same function and configuration are denoted with the same numerals as those in the example embodiments described above to avoid any redundant description.

Figure 9A:
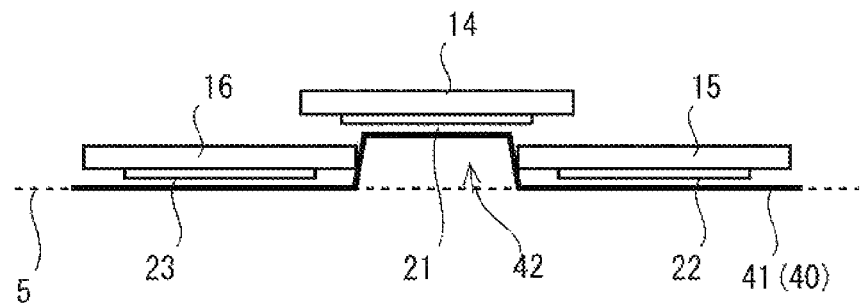
FIG. 9A is a top view of the display devices disposed overlapping each other and a common panel according to one example embodiment of the technology.
Figure 9B:
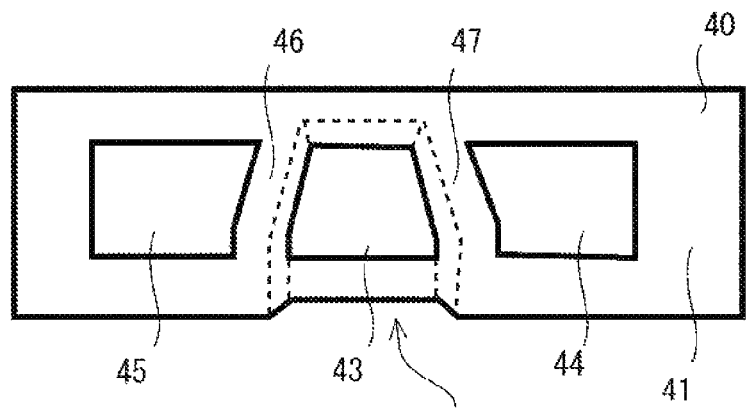
FIG. 9B is a plan view of the common panel illustrated in FIG. 9A.
Figure 9C:
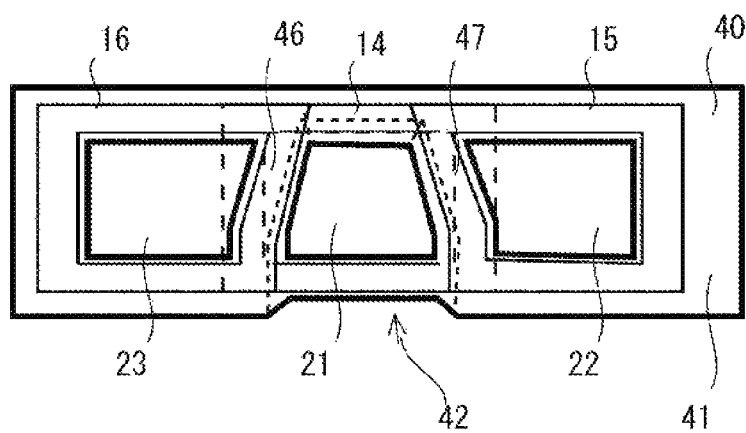
FIG. 9C is a plan view of the display devices disposed overlapping each other and the common panel illustrated in FIG. 9A.

FIG. 9A is a top view of the display devices disposed overlapping each other and a common panel 40. FIG. 9B is a plan view of the common panel 40 illustrated in FIG. 9A. FIG. 9C is a plan view of the display devices disposed overlapping each other and the common panel 40 illustrated in FIG. 9A. With reference to FIG. 9A, the common panel 40 may be detachably attached to the dashboard 5 in the vehicle compartment 3 of the automatic vehicle 1. The center monitor 14, the right monitor 15, and the left monitor 16 may be arranged side by side and covered with the common panel 40. The center monitor 14 may be disposed at a relatively large longitudinal distance from the right monitor 15 and the left monitor 16.

With reference to FIG. 9B, the common panel 40 may have a flat portion 41 and recessed portion 42. The flat portion 41 may constitute substantially the entire common panel 40 and have a horizontally-long, substantially-rectangular shape. The recessed portion 42 may be provided at the center of the horizontally-long flat portion 41. The recessed portion 42 may have a center opening 43. A right opening 44 may be provided on the right of the recessed portion 42 of the horizontally-long flat portion 41. A left opening 45 may be provided on the left of the recessed portion 42 of the horizontally-long flat portion 41. The common panel 40 may have a left curved part 46 between the center opening 43 and the left opening 45. The left curved part 46 may have a shape conforming to the contour shape of the left side face of the vehicle body 2 of the automatic vehicle 1. The common panel 40 may have a right curved part 47 between the center opening 43 and the right opening 44. The right curved part 47 may have a shape conforming to the contour shape of the right side face of the vehicle body 2 of the automatic vehicle 1.

With reference to FIG. 9C, the center opening 43 of the recessed portion 42 of the common panel 40 may face the display screen 21 of the center monitor 14. The right opening 44 may face the display screen 22 of the right monitor 15. The left opening 45 may face the display screen 23 of the left monitor 16.

In the third example embodiment described above, the center monitor 14, the right monitor 15, and the left monitor 16 may be covered with the common panel 40 provided in the vehicle compartment 3 of the automatic vehicle 1 such that the center opening 43, the right opening 44, and the left opening 45 provided side by side in the common panel 40 may respectively face the center monitor 14, the right monitor 15, and the left monitor 16. The left curved part 46 of the common panel 40 between the center opening 43 and the left opening 45 may have the shape conforming to the contour shape of the left side face of the vehicle body 2 of the automatic vehicle 1. The right curved part 47 of the common panel 40 between the center opening 43 and the right opening 44 may have the shape conforming to the contour shape of the right side face of the vehicle body 2 of the automatic vehicle 1. Thus, the center monitor 14 facing the center opening 43 provided in the recessed portion 42 of the common panel 40 may display the center display image of the environment present in the center rear direction from the automatic vehicle 1. The right monitor 15 facing the right opening 44 provided in the flat portion 41 of the common panel 40 may display the right display image of the environment present in the right rear direction from the automatic vehicle 1. The left monitor 16 facing the left opening 45 provided in the flat portion 41 of the common panel 40 may display the left display image of the environment present in the left rear direction from the automatic vehicle 1. The right display image and the left display image may be displayed at a longitudinal distance from the center display image.

In the third example embodiment described above, the common panel 40 covering the center monitor 14, the right monitor 15, and the left monitor 16 may be a single piece of panel. However, in another example embodiment, the common panel 40 may include three separate pieces detachable from the respective monitors.

It should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

In the example embodiments described above, the right rear camera 12 and the left rear camera 13 may be provided at respective positions corresponding to installation positions of door mirrors on the assumption that the door mirrors are provided on the automatic vehicle 1. Alternatively, the right rear camera 12 and the left rear camera 13 may be provided on the rear surface of the vehicle body 2, for example. As illustrated in FIG. 7, for instance, the right rear camera 12 may be provided at an upper right position 33 at a roof height or a vertical center position 34 of the vehicle body 2 on the rear surface of the vehicle body 2. The left rear camera 13 may be provided at an upper left position 35 at the roof height or a vertical center position 36 of the vehicle body 2 on the rear surface of the vehicle body 2 illustrated in FIG. 7. Likewise, the center rear camera 11 may be provided at a center position 31 at the roof height or a vertical center position 32 of the vehicle body 2 on the rear surface of the vehicle body 2, as illustrated in FIG. 7. The center rear camera 11 may be provided at a position along the line YO (illustrated in FIG. 1) extending through the width center of the vehicle body 2. The images generated by the imaging devices provided on the rear surface of the vehicle body 2 as described above include no image of the vehicle body 2. The captured images thus represent the environment behind the automatic vehicle 1 clear of obstruction of the vehicle body 2. The captured images may be appropriately used to detect the presence of a moving object behind the automatic vehicle 1, the direction in which the moving object is present, and the distance from the automatic vehicle 1 to the moving object, as well as being displayed on the monitors. For example, the direction or distance to the moving object present behind the automatic vehicle 1 may be trigonometrically calculated on the basis of the position of the moving object in the images generated by the right rear camera 12 and the left rear camera 13. In this case, the right rear camera 12 and the left rear camera 13 may serve as a stereo camera.

The invention claimed is:

1. An outside-vehicle environment monitoring apparatus comprising:
    a plurality of imaging devices including
        a center imaging device configured to capture an image of an environment present in a center rear direction from a vehicle and generate a center captured image,
        a right imaging device configured to capture an image of an environment present in a right rear direction from the vehicle and generate a right captured image, and
        a left imaging device configured to capture an image of an environment present in a left rear direction from the vehicle and generate a left captured image;
    a controller configured to acquire captured images from the plurality of imaging devices and output display images based on the respective captured images; and
    a plurality of display devices arranged side by side in a vehicle compartment of the vehicle within a visual range of an occupant, the plurality of display devices being configured to display the respective display images outputted from the controller, wherein
    the display devices include
        a center display device configured to display a center display image based on the center captured image generated by the center imaging device,
        a right display device disposed on a right side of the center display device as viewed from the occupant and configured to display a right display image based on the right captured image generated by the right imaging device, and
        a left display device disposed on a left side of the center display device as viewed from the occupant and configured to display a left display image based on the left captured image generated by the left imaging device,
    the center display device is disposed between the right display device and the left display device at a visible distance from the occupant, the visible distance being different from a visible distance from the occupant to the right display device and a visible distance from the occupant to the left display device, and
    the display devices are configured to allow the center display image displayed between the right display image and the left display image in the visual range to be visually perceived as having a depth relative to the right display image and the left display image.

2. The outside-vehicle environment monitoring apparatus according to claim 1, wherein
    the right display device has a first end adjacent to the center display device, the first end having an outer shape conforming to a contour shape of a right side face of a vehicle body of the vehicle,
    the left display device has a second end adjacent to the center display device, the second end having an outer shape conforming to a contour shape of a left side face of the vehicle body of the vehicle,
    the center display device is configured to display the center display image of the environment present in the center rear direction from the vehicle in a region defined between the first end of the right display device having the outer shape and the second end of the left display device having the outer shape,
    the right display device is configured to display the right display image of the environment present in the right rear direction from the vehicle in a region rightward from the first end of the right display device having the outer shape, and
    the left display device is configured to display the left display image of the environment present in the left rear direction from the vehicle in a region leftward from the second end of the left display device having the outer shape.

3. The outside-vehicle environment monitoring apparatus according to claim 1, wherein
    the right display device is disposed overlapping a right end part of the center display device,
    the left display device is disposed overlapping a left end part of the center display device,
    the right end part and the left end part of the center display device are made invisible by being respectively covered with the right display device and the left display device, and
    a center part of the center display device is uncovered with the right display device and the left display device.

4. The outside-vehicle environment monitoring apparatus according to claim 2, wherein
    the right display device is disposed overlapping a right end part of the center display device,
    the left display device is disposed overlapping a left end part of the center display device,
    the right end part and the left end part of the center display device are made invisible by being respectively covered with the right display device and the left display device, and
    a center part of the center display device is uncovered with the right display device and the left display device.

5. The outside-vehicle environment monitoring apparatus according to claim 1, wherein
    the center display device, the right display device, and the left display device are covered with a common panel provided in the vehicle compartment of the vehicle,
    the common panel has a center opening facing the center display device, a right opening facing the right display device, and a left opening facing the left display device,
    the common panel has a right curved part between the center opening and the right opening, the right curved part having a shape conforming to the contour shape of a right side face of a vehicle body of the vehicle, and
    the common panel has a left curved part between the center opening and the left opening, the left curved part having a shape conforming to a contour shape of a left side face of the vehicle body of the vehicle.

6. The outside-vehicle environment monitoring apparatus according to claim 1, wherein
    the right display device has a display screen having a left end adjacent to the center display device, the left end having a shape conforming to the right side face of the vehicle body of the vehicle, and the left display device has a display screen having a right end adjacent to the center display device, the right end having a shape conforming to the left side face of the vehicle body of the vehicle.

7. The outside-vehicle environment monitoring apparatus according to claim 2, wherein
   the right display device has a display screen having a left end adjacent to the center display device, the left end having a shape conforming to the right side face of the vehicle body of the vehicle, and
   the left display device has a display screen having a right end adjacent to the center display device, the right end having a shape conforming to the left side face of the vehicle body of the vehicle.

8. The outside-vehicle environment monitoring apparatus according to claim 1, wherein
   a boundary between the center display device and the right display device has an outer shape conforming to a shape of a rear portion of the vehicle body of the vehicle visually identifiable from an installation position of a right door mirror on an assumption that the right door mirror is provided, and
   a boundary between the center display device and the left display device has an outer shape conforming to the shape of the rear portion of the vehicle body of the vehicle visually identifiable from an installation position of a left door mirror on an assumption that the left door mirror is provided.

9. The outside-vehicle environment monitoring apparatus according to claim 2, wherein
   a boundary between the center display device and the right display device has an outer shape conforming to a shape of a rear portion of the vehicle body of the vehicle visually identifiable from an installation position of a right door mirror on an assumption that the right door mirror is provided, and
   a boundary between the center display device and the left display device has an outer shape conforming to the shape of the rear portion of the vehicle body of the vehicle visually identifiable from an installation position of a left door mirror on an assumption that the left door mirror is provided.

10. The outside-vehicle environment monitoring apparatus according to claim 1, wherein
    a boundary between the center display device and the right display device, and a boundary between the center display device and the left display device each have an outer shape conforming to a shape of a rear portion of the vehicle body visually identifiable from the vehicle in a rear direction.

11. The outside-vehicle environment monitoring apparatus according to claim 2, wherein
    a boundary between the center display device and the right display device, and a boundary between the center display device and the left display device each have an outer shape conforming to a shape of a rear portion of the vehicle body visually identifiable from the vehicle in a rear direction.

12. The outside-vehicle environment monitoring apparatus according to claim 1, wherein
    the right imaging device and the left imaging device are disposed at a position more rearward than a position of a driver's seat in the vehicle body of the vehicle.

13. The outside-vehicle environment monitoring apparatus according to claim 2, wherein
    the right imaging device and the left imaging device are disposed at a position more rearward than a position of a driver's seat in the vehicle body of the vehicle.

14. The outside-vehicle environment monitoring apparatus according to claim 1, wherein
    the center display device is disposed at a position farther from a seat for the occupant provided in the vehicle compartment of the vehicle than positions of the right display device and the left display device are.

15. The outside-vehicle environment monitoring apparatus according to claim 2, wherein
    the center display device is disposed at a position farther from a seat for the occupant provided in the vehicle compartment of the vehicle than positions of the right display device and the left display device are.

* * * * *